United States Patent [19]

Skynar

[11] Patent Number: 4,519,589
[45] Date of Patent: May 28, 1985

[54] ANTI-SPLAY SHIM FOR A TWO STAGE LEAF SPRING ASSEMBLY

[75] Inventor: Larry Skynar, Northville, Mich.

[73] Assignee: Ford Motor Company, Dearborn, Mich.

[21] Appl. No.: 443,842

[22] Filed: Nov. 22, 1982

[51] Int. Cl.³ .............................................. B60G 19/02
[52] U.S. Cl. ........................................ 267/52; 267/49
[58] Field of Search ...................... 267/36 R, 37 A, 47, 267/48, 49, 52, 158, 164, 7, 17 A, 25, 30, 40, 46, 50; 308/244

[56] References Cited

U.S. PATENT DOCUMENTS

| 134,859 | 1/1873 | Dean | 267/52 |
|---|---|---|---|
| 343,879 | 6/1886 | Wiestner | 267/52 |
| 1,382,541 | 6/1921 | Pesznecker | 267/52 |
| 1,892,932 | 1/1933 | Cook | 267/52 |
| 1,967,088 | 7/1934 | Geyer | 267/47 |
| 2,014,482 | 9/1935 | Pedranti | 267/52 |
| 2,028,299 | 1/1936 | Swinton | 267/49 |
| 2,667,347 | 1/1954 | Jacobs | 267/37 A |
| 2,735,672 | 2/1956 | Bradley | 267/49 |
| 2,891,787 | 6/1959 | Reinhardt | 267/49 |
| 3,159,389 | 12/1964 | Clary | 267/50 |
| 3,321,199 | 5/1967 | Forbush | 267/36 R |
| 3,580,347 | 5/1971 | McGee | 267/40 |
| 3,591,197 | 7/1971 | Haley | 267/52 |
| 4,227,716 | 10/1980 | Nordström | 267/52 |

FOREIGN PATENT DOCUMENTS 1208559  5/1964  Fed. Rep. of Germany ........ 267/49

Primary Examiner—Bruce H. Stoner, Jr.
Assistant Examiner—Robert J. Oberleitner
Attorney, Agent, or Firm—Jerome R. Drouillard; Roger L. May

[57] ABSTRACT

An anti-splay shim 50 and low friction liner 80 are incorporated in the center section 12 of a leaf spring assembly 10 for preventing splaying of the second stage leaf 36 with respect to the first stage leaves 22, 24 and 26. The anti-splay shim 50 has an upturned flange 50 which abuts edges of 62 and 64 of the first stage leaves 24 and 26 and a downward turned flange 58 which abuts an opposite facing edge 66 of the second stage leaf 36. In addition, a low friction liner 80 is interposed between a second stage leaf 36 and a spring seat 34 which is fixed to an axle 14. The low friction liner 80 minimizes torque transfer about a vertical axis from the axle 14 to the second stage leaf 36.

3 Claims, 4 Drawing Figures

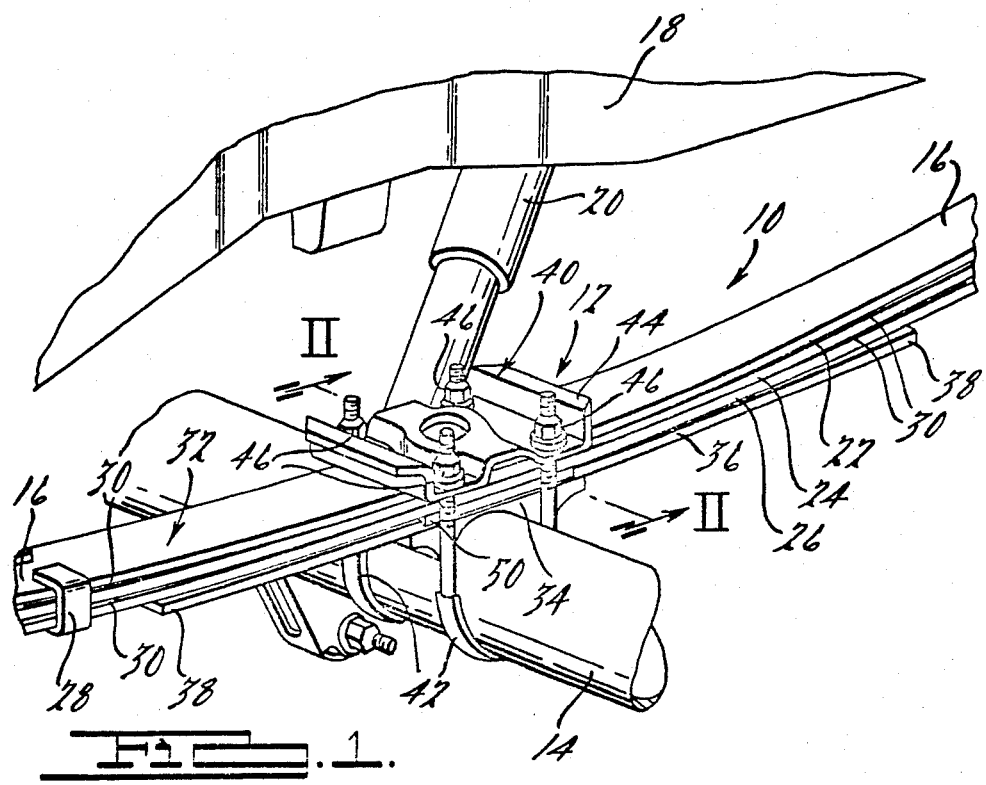
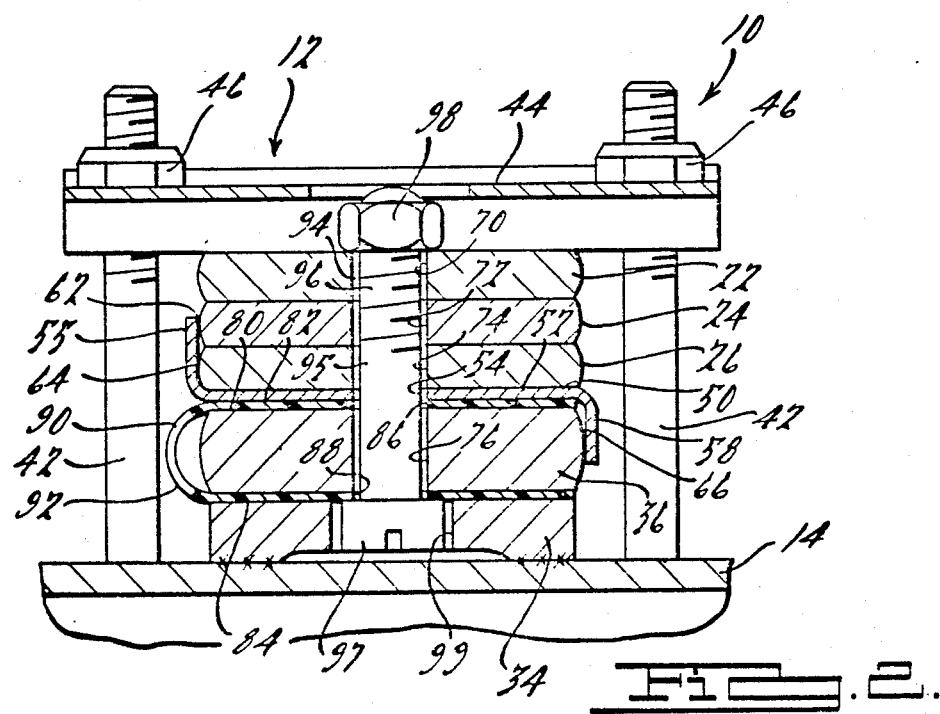

ANTI-SPLAY SHIM FOR A TWO STAGE LEAF SPRING ASSEMBLY

TECHNICAL FIELD

This invention relates to motor vehicle suspensions and, more particularly, to suspensions incorporating two stage leaf spring assemblies.

BACKGROUND DISCLOSURE INFORMATION

Leaf spring assemblies for motor vehicles often include a plurality of leaf springs stacked upon one another. The resilient rate of a leaf spring assembly can be determined in part by the number of leaves. The plurality of leaves are commonly secured to each other by one or more clips which circumscribe the plurality of leaves. Commonly, the clips are positioned near the axial ends of the leaves.

Leaf spring assemblies have also been designed to provide a first resilient rate for a predetermined amount of movement and then provide a second higher resilient rate or any movement beyond the predetermined amount. These leaf spring assemblies are commonly called two stage leaf spring assemblies. Two stage leaf spring assemblies are presently incorporated in many different compact pickup trucks.

Two stage leaf spring assemblies commonly have a second stage leaf aligned below a stack of first stage leaves. The second stage leaf is attached to a central portion of the stack of leaves. The second stage leaf spring has its outer axial ends spaced below the first stage leaves. The second stage leaf undergoes no flexure while the first stage leaves are flexed from an unflexed first position to a second intermediate position. When the first stage leaves are in the second intermediate position, the space between the outer ends of the second stage leaf and the first stage leaves is closed and the outer ends abut the first stage leaves. Further flexure of the leaf spring assembly beyond the second position causes the second stage leaf to flex, thus adding to the resilient rate to the leaf spring assembly.

The second stage leaf is secured to the spring seat and to the first stage leaves only at a center portion. Consequently, the second stage leaf may respond to torque about a vertical axis and rotate with respect to the first stage leaves. Torque is introduced by rotation of the axle about a vertical axis. Torque is transferred to the leaves via a spring seat fixed to the axle and seating the center portion of the leaves. The rotation about a vertical axis of the second stage leaf relative to the first stage leaves is commonly referred to as splaying. Splaying of the second stage leaf results in one end protruding outward from the leaf spring assembly and the other end protruding inward toward the central longitudinal axis of a motor vehicle. Even slight splaying is visually noticeable and may give a false impression to a motor vehicle operator that his vehicle needs repair. Excessive splaying can defeat the two stage function of the leaf spring assembly. The outer ends of the second stage leaf may splay sufficiently such that their outer ends no longer are able to contact the first stage leaves and, hence, will not undergo flexure. As a result, the second stage leaf may become nonfunctional.

Attempts have been made to minimize splaying of the second stage leaf. A clip has been mounted to the lower side of the second stage leaf near the outer ends thereof. The clip extends upwardly past the gap between the first stage leaves and second stage leaf and surround the first stage leaves. Furthermore, to be effective, the clip must be long enough to extend above the first stage leaves to take into account upward movement of the first stage leaves relative to the second stage leaf when the vehicle goes into rebound. The overall length, particularly the portion below the first stage leaves, presents an undesirable appearance. In addition, the long clip is an added expense which should be minimized.

An anti-splay device is desired which is relatively inexpensive and unobtrusive.

SUMMARY OF THE INVENTION

In accordance with the invention, a two stage leaf spring assembly has a stack of leaves forming a first stage spring assembly section. Each end of the stack of leaves is connected in conventional fashion to a vehicle frame. The stack of leaves are fastened together in a conventional fashion. A second stage leaf spring is interposed between the stack of leaves and a spring seat fixed to an axle of the vehicle. A bracket secures the center portion of the stack of leaves and the second stage leaf to the spring seat. The second stage leaf has ends normally spaced from the first stage leaf spring assembly section when the vehicle is in an unloaded position.

The two stage leaf spring assembly includes an anti-splay device. The anti-splay device includes a shim member interposed between a center portion of a second stage leaf and a bottom leaf of a first stage leaf spring assembly section. The shim has at one edge thereof an upturned flange abutting a side of at least one first stage leaf. The shim has at an opposite edge thereof a downturn flange abutting an opposite facing side of the second stage leaf. A securing device secures the center portion of the second stage leaf, the center portion of the first stage leaves, and the shim member together. The shim member is constructed to have sufficient lateral strength in its flanges for preventing relative rotation about the vertical axis of the second stage leaf relative to the other leaves thereby preventing splaying of the second stage leaf spring.

Preferably, a low friction material is interposed between the second stage leaf and the spring seat. Also, the low friction material is preferably interposed between the second stage leaf and the shim. The securing device also secures the low friction material in position at the center portion of the leaf spring assembly. The low friction material reduces the transfer of torque about a vertical axis from the axle to the second stage leaf.

In one embodiment, the low friction material is a one-piece foldable member having an upper section and lower section. The upper section is interposed between the second stage leaf spring and the shim. The lower section is interposed between the second stage leaf and the spring seat.

In one embodiment, the securing device includes a bolt passing through aligned apertures in the second stage leaf, the first stage leaves, the shim, and the one-piece low friction liner. The bolt has an enlarged head and a threaded section passing through the aligned apertures. The leaf spring shim and liner are clamped between the enlarged head and a nut that threadably engages the bolt. The spring seat has a recess therein for receiving the head of the bolt.

In broader terms, the invention relates to a two stage leaf spring assembly having a second stage leaf and at least one first stage leaf forming a first stage leaf spring assembly section. The ends of at least one first stage leaf are connected to the vehicle frame in a conventional fashion. The second stage leaf spring is interposed between the first stage leaf spring assembly section and a spring seat attached to an axle of the vehicle. A bracket secures the leaf springs to the spring seat. The second stage leaf spring has ends normally spaced from the first stage leaf spring assembly section when the vehicle is in an unloaded position. A shim member is interposed between two leaves of the dual stage leaf spring assembly. The shim member has a first vertical flange abutting a side of said second stage leaf and a second vertical flange abutting an opposite facing side of at least one first stage leaf. A securing device secures the leaves and the shim together.

BRIEF DESCRIPTION OF THE DRAWINGS

Reference now will be made to the accompanying drawings in which:

FIG. 1 is a fragmentary perspective view showing a two stage leaf spring assembly for a motor vehicle;

FIG. 2 is a fragmentary cross-sectional view taken along the lines II—II in FIG. 1;

DETAILED DESCRIPTION OF THE PREFERRED EMBODIMENT

Figure 3:
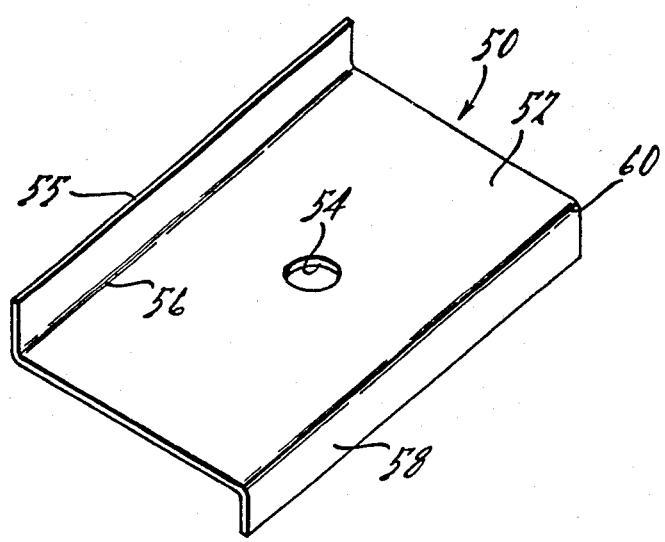
FIG. 3 is a perspective view of the shim shown in FIGS. 1 and 2.

Referring to FIG. 1, a two stage leaf spring assembly 10 has a center portion 12 connected to an axle 14 and has two end portions 16 connected to a frame 18 in a conventional fashion such as via shackles or bushings (not shown). A conventional shock absorber 20 has its ends attached to the axle 14 and the frame 18 also in a conventional fashion.

The two stage leaf spring assembly 10 includes a plurality of first stage leaves 22, 24 and 26. The first stage leaves are clipped together near the outer end 16 via a clip 28. In addition, liners 30 may be interposed between the leaves 22, 24 and 26. The leaves 22, 24 and 26, clip 28, and liners 30 form a first stage leaf spring assembly section 32.

A second stage leaf 36 is interposed between the bottom leaf 26 of the first stage leaf spring assembly section 32 and a spring seat 34 that is fixed to the axle 14. The second stage leaf 36 has its outer ends 38 normally spaced from the bottom leaf 26 of the first stage leaf spring assembly section 32. The first stage leaf spring assembly section 32 and the second stage leaf 36 are secured to the spring seat 34 via a bracket assembly 40. The bracket assembly 40 includes two U bolts 42 secured about axle 14 and extending through apertures (not shown) in a plate 44. Nuts 46 threadably engage the ends of the U bolts thereby fastening the plate 44 against the top spring 22 and clamping the leaves 22, 24, 26 and 36 against the spring seat 34.

A shim 50 is interposed between the bottom first stage leaf 26 and the second stage leaf 36 at the center portion 12. The length of the shim is approximately 11 cm. The shim 50 is made from cold rolled steel and has a thickness of approximately 2.5 mm. Other grades of steel such as 980 or spring steel may also be used. As shown in more detail in FIGS. 2 and 3, the shim 50 has a plate section 52 with a central aperture 54 therethrough. The plate section 52 is interposed between the leaf 26 and the second stage leaf 36. The shim 50 has an upturned flange 55 at one edge 56 and a downturned flange 58 at an opposite edge 60. The upturned flange 55 abuts the edges 62 and 64 of the first stage leaves 24 and 26. The downturned flange 58 abuts an opposite facing edge 66 of the second stage spring 36. The flanges 55 and 58 extend the full length of the shim such that the flange extends a sufficient axial distance from the center of seat 34 to prevent rotation about a vertical axis which coincides with center of seat 34. The aperture 54 is aligned with apertures 70, 72, 74 and 76 in the respective first stage leaves 22, 24, 26 and the second stage leaf 36.

Figure 4:
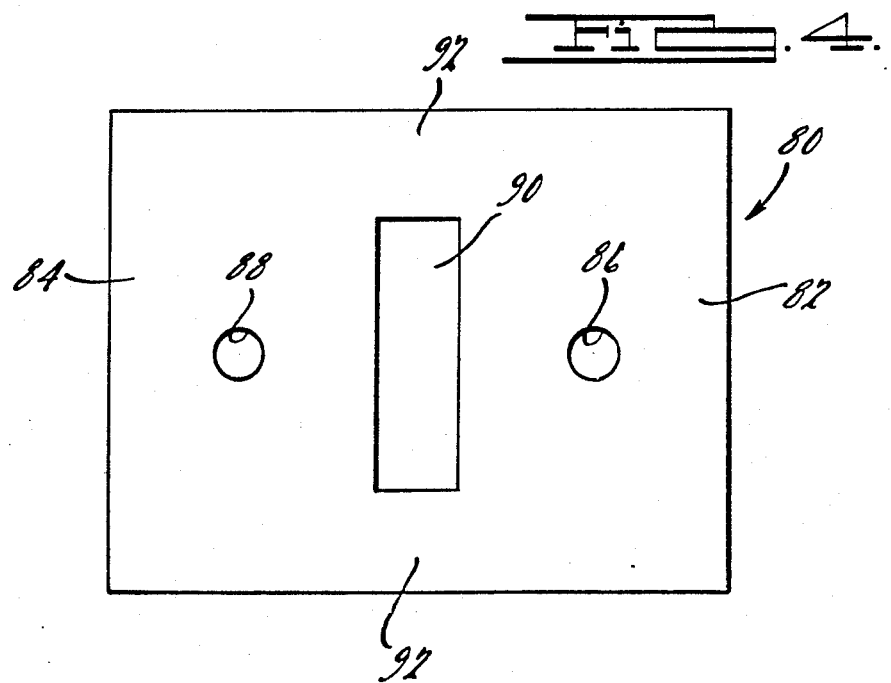
FIG. 4 is a plan view of the one-piece low friction liner shown in FIGS. 1 and 2 in a flat, unfolded position.

In addition, a one-piece low friction liner 80 has an upper section 82 interposed between the plate section 52 and the second stage leaf 36. The one-piece liner 80 also has a lower section 84 interposed between the second stage leaf 36 and the spring seat 34. As shown in FIG. 4, the one-piece liner is substantially rectangular in shape with an aperture 86 passing through the upper section 82 and an aperture 88 passing through the lower section 84. A rectangular void 90 is interposed between the lower and upper sections. Folding sections 92 connect the upper section 82 with the lower section 84. The liner 80 can be made from low friction material such as "Delrin", a trademark of E. I. duPont de Nemours & Co. "Delrin" refers to a class of thermoplastic acetal resins used for injection molded and extruded parts, door handles, bushings, other mechanical items, underground pipe and automotive parts.

Referring back to FIG. 2, when the low friction liner 80 is folded in position, its apertures 86 and 88 are aligned with the apertures 70, 72, 74, 54 and 76 to form a passage 94 through the center portion 12 of the dual stage leaf spring assembly. A bolt 95 has a threaded section 96 passing through the passage 94. The bolt has an enlarged head 97 which has a diameter larger than the diameter of the passage 94. A nut 98 engages the threaded section 96 and is also sized larger than the diameter section to clamp the first stage leaves 22, 24, 26; the second stage leaf 36; the shim 50; and the liner 80 together. The head 97 fits within a recess 99 of the spring seat 34 to allow the liner 80 to lay flat against the spring seat 34. The recess 99 is coincidental with the center of seat 34.

If the axle has exerted upon it torque loads about a vertical axis, the axle tends to rotate about the vertical axis. If any rotation occurs, the spring seat which is secured to the axle 14 also undergoes rotation about the vertical axis. However, the "Delrin" liner 80 reduces the transfer of any torque from the spring seat 34 to the second stage leaf 36. In spite of the "Derin" liner, some torque may transfer through the "Delrin" liner to the second stage leaf 36. The torque wants to rotate leaf 36. However, rotation of the leaf 36 with respect to leaves 22, 24 and 26 is prevented by the edge 66 of the leaf 36 abutting the downturned flange 58 of the shim 50. The shim 50 is anchored by the upturned flange 55 abutting the edges 62 and 64 of the first stage leaves. A shim made from cold rolled steel of approximately 2.5 mm thickness gives sufficient strength to the shim to resist normal torque forces transferred to the leaf 36 from the axle 14 through the Delrin liner. If the Delrin liner 80 is absent, the shim should be made from 980 grade or spring steel to resist normal torque forces.

In this fashion, the second stage leaf 36 is prevented from rotating (i.e., splaying) about a vertical axis aligned with bolt 95 relative to the first stage leaves 22, 24 and 26. The second stage leaf 36 maintains alignment with the first stage leaves whereby the outer ends 38 remain under the first stage leaves. Unattractive protrusions extending transverse to the outer ends 38 of spring 36 are eliminated. In addition, the two stage function of the two stage leaf spring is assured. The above advantages are obtained by a relatively inexpensive and unobtrusive assembly that replaces an unattractive, obtrusive, and expensive clip surrounding the outer end 38 of the second stage leaf 36.

Variations and modifications of the present invention are possible without departing from its scope and spirit as defined by the appended claims.

Industrial Applicability

This invention has industrial applicability to motor vehicles and more particularly to leaf spring assemblies incorporated in motor vehicles.

The embodiments of the invention in which an exclusive property or privilege is claimed are defined as follows:

1. A two stage leaf spring assembly for a vehicle, said leaf spring assembly characterized by:
    a stack of leaves forming a first stage leaf spring assembly section;
    means for fastening the stack of leaves together;
    a second stage leaf interposed between said stack of leaves and a spring seat attached to an axle of the vehicle;
    said second stage leaf having ends normally spaced from said stack of leaves when said vehicle is in an unloaded position;
    a shim member interposed between an axial center portion of the stack of leaves and the center portion of the second stage leaf;
    said shim member having an upturned flange abutting a side of the stack of leaves and a downturned flange abutting an opposite facing side of the second stage leaf;
    a one-piece low friction liner being folded about both upper and lower faces of the second stage leaf spring such that an upper section of said liner is interposed between said shim and said second stage leaf spring and a lower section of said liner interposed between said spring seat and said second stage leaf spring;
    each of said leaves in said stack, said second stage leaf, said shim, said upper section of said liner, and said lower section of said liner define an aperture;
    said defined apertures being aligned to form a passage;
    securing means passing through said passage for securing said stack of leaf springs, said second stage leaf spring, said shim, and said liner together; and
    said shim constructed to have sufficient strength for resisting torque about a vertical axis transferred from said spring seat to said second stage spring and preventing relative rotation of said second stage leaf spring with respect to said stack of leaves whereby splaying of the second stage leaf is minimized.

2. A leaf spring assembly as defined in claim 1 wherein:
    said securing means includes a bolt and nut threadably engaging said bolt;
    said bolt having a threaded section passing through said passage and an enlarged head section;
    said leaf spring, shim and liner being clamped between said enlarged head section and said nut; and
    said spring seat having a recess therein for receiving said head of said bolt.

3. A two stage leaf spring assembly for a vehicle, said leaf spring assembly characterized by:
    a stack of leaves forming a first stage spring assembly;
    means for fastening said stack of leaves together;
    a second stage leaf interposed between said stack of leaves and a spring seat fixed to an axle of the vehicle;
    bracket means for securing the center portion of said leaves to said spring seat;
    said second stage leaf having ends normally spaced from said stack of leaves when said stack of leaves is in an unflexed position;
    a shim member interposed between an axial center portion of the stack of leaves and the center portion of the second stage leaf;
    said shim member having an upturned flange at one edge thereof abutting a side of said stack of leaves and a downturned flange at an opposite edge thereof abutting an opposite facing side of the second stage leaf;
    securing means for securing a center portion of the stack of leaves, said second stage leaf spring, and said shim member together;
    a one-piece, low friction member folded over and interposed between the second stage leaf and said shim and between the second stage leaf and said spring seat, said securing means securing said one-piece low friction member in place; and
    said shim being constructed to have sufficient lateral strength for resisting torque about a vertical axis transferred from said spring seat to said second stage leaf and for preventing relative rotation about a vertical axis of said second stage leaf with respect to said stack of leaves whereby splaying of the second stage leaf is minimized.

* * * * *